United States Patent
Backhaus-Ricoult et al.

(10) Patent No.: US 10,301,222 B2
(45) Date of Patent: May 28, 2019

(54) CERAMIC POWDERS WITH CONTROLLED SIZE DISTRIBUTION

(71) Applicant: Corning Incorporated, Corning, NY (US)

(72) Inventors: Monika Backhaus-Ricoult, Bourron (FR); Robert John Locker, Corning, NY (US); Huthavahana Kuchibhotla Sarma, Painted Post, NY (US); Patrick David Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/527,227

(22) PCT Filed: Nov. 18, 2015

(86) PCT No.: PCT/US2015/061256
§ 371 (c)(1),
(2) Date: May 16, 2017

(87) PCT Pub. No.: WO2016/081552
PCT Pub. Date: May 26, 2016

(65) Prior Publication Data
US 2017/0362128 A1    Dec. 21, 2017

Related U.S. Application Data

(60) Provisional application No. 62/081,627, filed on Nov. 19, 2014.

(51) Int. Cl.
C04B 35/462    (2006.01)
C04B 35/478    (2006.01)
(Continued)

(52) U.S. Cl.
CPC .......... *C04B 35/478* (2013.01); *C01G 23/003* (2013.01); *C01G 23/006* (2013.01);
(Continued)

(58) Field of Classification Search
CPC .. C01G 23/003; C04B 35/478; C04B 35/6262
See application file for complete search history.

(56) References Cited

U.S. PATENT DOCUMENTS 4,327,188 A * 4/1982 Endo .................. B01J 35/04
                                                   264/177.12
4,915,887 A    4/1990 Day et al.
(Continued)

FOREIGN PATENT DOCUMENTS

CN    101074161 A    11/2007
EP    2266932 A1     12/2010
(Continued)

OTHER PUBLICATIONS

Uribe et al; "Formation of Aluminum Titanate by Solid State Reaction of Alumina and Titania"; Bol. Soc. Esp. Ceram. Vidrio, 39 [2] 221-228 (2000).
(Continued)

*Primary Examiner* — Noah S Wiese (57) ABSTRACT

Disclosed herein are methods for preparing a titanate compound powder comprising titanate compound particles having a controlled particle size and/or particle size distribution. The methods include mixing at least one first inorganic compound chosen from sources of a first metal or metal oxide, at least one second inorganic compound chosen from sources of titania, and at least one binder to form a mixture; calcining the mixture to form a polycrystalline material comprising a plurality of titanate compound grains and a plurality of microcracks; and breaking the polycrystalline material along at least a portion of the microcracks. Also
(Continued)

disclosed are titanate compound powders having a controlled particle size distribution, ceramic batch compositions comprising the powders, and ceramic articles prepared from the batch compositions.

20 Claims, 7 Drawing Sheets (51) Int. Cl.
*C01G 23/00* (2006.01)
*C04B 35/626* (2006.01)
*C04B 35/64* (2006.01)

(52) U.S. Cl.
CPC ........ *C04B 35/462* (2013.01); *C04B 35/6261* (2013.01); *C04B 35/62645* (2013.01); *C04B 35/64* (2013.01); *C01P 2004/03* (2013.01); *C01P 2004/51* (2013.01); *C01P 2004/61* (2013.01); *C04B 2235/3206* (2013.01); *C04B 2235/3232* (2013.01); *C04B 2235/3234* (2013.01); *C04B 2235/3249* (2013.01); *C04B 2235/3272* (2013.01); *C04B 2235/3281* (2013.01); *C04B 2235/5436* (2013.01); *C04B 2235/5463* (2013.01); *C04B 2235/602* (2013.01); *C04B 2235/6021* (2013.01); *C04B 2235/6562* (2013.01); *C04B 2235/6567* (2013.01); *C04B 2235/661* (2013.01); *C04B 2235/80* (2013.01); *C04B 2235/9607* (2013.01)

(56) References Cited

U.S. PATENT DOCUMENTS

| | | | |
|---|---|---|---|
| 8,399,376 | B2 | 3/2013 | Dien-Barataud et al. |
| 2011/0220445 | A1* | 9/2011 | Hasenfuss ................ B61B 5/02 191/10 |
| 2011/0236688 | A1* | 9/2011 | Suzuki ................ C01G 23/003 428/402 |
| 2011/0248106 | A1 | 10/2011 | Maki et al. |
| 2012/0073255 | A1 | 3/2012 | Nemoto et al. |

FOREIGN PATENT DOCUMENTS

| | | |
|---|---|---|
| EP | 2319816 A1 | 5/2011 |
| EP | 2336087 A1 | 6/2011 |
| EP | 2360130 A1 | 8/2011 |
| EP | 2415729 A1 | 2/2012 |
| JP | 2010138035 A | 6/2010 |
| JP | 2010138036 A | 6/2010 |
| JP | 2010150088 A | 7/2010 |
| JP | 2010159197 A | 7/2010 |
| JP | 2010180120 A | 8/2010 |
| JP | 2011020899 A | 2/2011 |
| WO | 2006015240 A2 | 2/2006 |
| WO | 2010001062 A2 | 1/2010 |
| WO | 2010095615 A1 | 8/2010 |
| WO | 2014028207 A1 | 2/2014 |
| WO | 2014046912 A1 | 3/2014 |

OTHER PUBLICATIONS

The International Searching Authority; PCT International Search Report and Written Opinion; PCT/US2015/061256, dated Feb. 11, 2016.

Saghezchi, "Characterization of additive influence on reaction sintering of nano aluminum titanate". Proc. of SPIE vol. 7402, 7402T, http://proceedings.spiedigitallibrary.org, accessed Sep. 11, 2014.

Okamura, "Preparation and Sinteringof Monosized Al2O3-TiO2 Composite Powder". Communications of the American Ceramic Society; J. Am. Ceram. Soc., 69[2], 1986, pp. C22-C24.

English Translation of CN201580073660.5 Office Action dated Jun. 25, 2018; 14 Pages; Chinese Patent Office.

English Translation of JP2017526850 Office Action dated Jul. 10, 2018; 6 Pages; Japanese Patent Office.

* cited by examiner

CERAMIC POWDERS WITH CONTROLLED SIZE DISTRIBUTION

CROSS REFERENCE TO RELATED APPLICATION

This application is a national stage application under 35 U.S.C. § 371 of International Application No. PCT/US15/061256, filed on Nov. 18, 2015, which claims the benefit of U.S. Provisional Patent Application Ser. No. 62/081,627, filed on Nov. 19, 2014, the contents of these applications are relied upon and incorporated herein by reference in their entireties.

DESCRIPTION

Technical Field

The disclosure relates to ceramic powders having a controlled particle size distribution, and methods of making such ceramic powders.

BACKGROUND

Formed ceramic bodies, including but not limited to high surface area structures, for example porous honeycomb bodies, may be used in a variety of applications. Such formed ceramic bodies may be used, for example, as supports for catalysts for carrying out chemical reactions or as sorbents or filters for the capture of particulate, liquid, or gaseous species from fluids such as gas streams and liquid streams. As a non-limiting example, certain high surface area materials, such as, for example, honeycomb-shaped bodies, may be used as catalyst substrates or for the capture of heavy metals from gas streams.

Low coefficient of thermal expansion ("CTE") ceramics are one category of ceramics used in environmental filtration applications. Two examples of low CTE materials are cordierite and aluminum titanate ("AT"). One process used in the manufacture of ceramic honeycombs involves batching cordierite or AT precursor materials, forming a green body, and reaction sintering the precursor materials to produce the final phase (e.g., cordierite or AT) in situ. This process can lead to the formation of liquids near the top soak temperature, however, as well as considerable shrinkage of the green body due to sintering and reaction of the precursor materials.

In addition, the process using reaction sintering often uses large amounts of pore formers for making high porosity honeycombs. In some embodiments, reduced amounts of pore formers may increase efficiencies and cost reductions.

Finally, the particle size distribution ("PSD") of the ceramic batch materials plays a key role in realizing the desired microstructure. The process using reaction sintering can require the use of premium grade raw materials in order to obtain the desired microstructure.

Thus, it would be useful to have alternate methods.

SUMMARY

In accordance with various embodiments of the disclosure, methods of producing titanate compound powders or titanate compound powder precursors having a specified particle size and/or particle size distribution are disclosed. The methods include mixing at least one first inorganic compound chosen from sources of a first metal or metal oxide, at least one second inorganic compound chosen from sources of titania, and at least one binder to form a mixture; calcining the mixture at a temperature for an amount of time to form a polycrystalline material comprising a plurality of titanate compound grains, wherein the polycrystalline material further comprises a plurality of microcracks; and breaking the polycrystalline material along at least a portion of the microcracks to provide a titanate compound powder comprising titanate compound particles having a controlled particle size and/or particle size distribution.

In various embodiments, the first metal or metal oxide is chosen from sources of aluminum, alumina, magnesium, magnesium oxide, iron, iron oxide, and combinations thereof. In some embodiments, the first metal oxide is alumina.

The mixture may, in certain embodiments, further include at least one compound chosen from magnesium compounds, iron compounds, and combinations thereof. In some embodiments, the mixture further includes at least one silica component, for example colloidal silica.

In various embodiments, the polycrystalline material may comprise grains comprising aluminum titanate, magnesium dititanate, iron titanate, silica, and combinations thereof.

In some embodiments, the mixture is formed into at least one shaped or unshaped body before the calcining step.

In various embodiments, the time period may range up to about 30 hours, for example from about 1 hour to about 25 hours.

The temperature may, in certain embodiments, range from about 1200° C. to about 1800° C.

In some embodiments, the titanate compound particles have a controlled particle size distribution characterized by a $d_{50}$ ranging from about 5 µm to about 60 µm. In certain embodiments, the titanate compound particles have an average particle size ranging from about 1 µm to about 100 µm.

In various embodiments, breaking the polycrystalline material along at least a portion of the microcracks includes milling the polycrystalline material. In some embodiments, the polycrystalline material is self-milling.

In accordance with other exemplary embodiments of the disclosure, methods for preparing a ceramic article is disclosed. The methods include mixing at least one first inorganic compound chosen from sources of a first metal or metal oxide, at least one second inorganic compound chosen from sources of titania, and at least one binder to form a mixture; calcining the mixture at a temperature for an amount of time to form a polycrystalline material comprising a plurality of titanate compound grains, wherein the polycrystalline material further comprises a plurality of microcracks; breaking the polycrystalline material along at least a portion of the microcracks to provide a titanate compound powder comprising titanate compound particles having a controlled particle size and/or particle size distribution; and preparing a ceramic batch composition comprising the titanate compound powder comprising titanate compound particles having a controlled particle size distribution.

In some embodiments, exemplary methods further comprise preparing a green ceramic body from the ceramic batch composition. In certain embodiments, the ceramic batch composition is spray dried, granulated, or extruded to form a green ceramic body. The methods may, in yet further exemplary embodiments, comprise firing the green ceramic body to prepare a ceramic article. In certain embodiments, the method further comprises a step of processing the ceramic batch composition to provide a ceramic plug or ceramic skin for application to a ceramic article.

In various embodiments, the ceramic article comprises a coefficient of thermal expansion ranging up to about $25 \times 10^{-7}/°C$. over a range of from about room temperature to about 800° C.

In accordance with other embodiments of the disclosure, a ceramic batch composition comprises particles having a controlled particle size distribution and comprises at least one compound chosen from aluminum titanate, magnesium dititanate, iron titanate, silica, and combinations thereof. In some embodiments, the ceramic batch composition includes one compound. In other embodiments, the ceramic batch composition includes two compounds. In yet other embodiments, the ceramic batch composition includes several compounds.

DESCRIPTION OF EXEMPLARY EMBODIMENTS

Embodiments of the disclosure relate to methods for the production of titanate compound powders having a specified or controlled particle size and/or particle size distribution ("PSD"). Titanate compound powder precursors are mixed with a binder to form a mixture, and the mixture is calcined to form a polycrystalline material. The polycrystalline material is broken apart to form a titanate compound powder. The control of the particle size and/or PSD of the powder is attained via the chemistry of the titanate compound powder precursors, and the processing parameters such as calcination time and temperature.

The polycrystalline materials produced as described herein can easily be broken apart to a predetermined particle size, independently of the method, machinery, or techniques used to mill the powders. Materials that can be reduced to a predetermined particle size and/or PSD upon exposure to any milling process without regard to the type of milling process, for example a disc pulverizing process, are referred to herein as "self-milling" materials. The predetermined particle size can also be referred to as a "controlled" particle size.

The titanate compound powders produced as described herein may be used as raw materials in various applications, for example extruded ceramic honeycombs or low coefficient of thermal expansion ("CTE") filler particles in ceramic skin and plug batch compositions. The controlled particle size and/or PSD of titanate compound powders produced according to embodiments of the disclosure may yield ceramic bodies having a desired porosity and low CTE, without reaction sintering during formation of the ceramic body. According to certain embodiments, firing of the ceramic body may result in densification of the ceramic body in addition to reaction of at least one precursor material to form the final ceramic body material. In other embodiments, firing of the ceramic body may result in densification of the ceramic body, and the titanate compound does not need to be formed during firing of the ceramic body. In these embodiments, the ceramic body is fired without in situ formation of the titanate compound.

Thus, various embodiments of the disclosure relate to forming ceramic bodies by pre-reacting titanate compound precursors to form titanate compound powder, preparing ceramic batch compositions with the titanate compound powder, forming ceramic green bodies with the batch compositions, and sintering the ceramic green bodies to form ceramic bodies. In some embodiments, the reaction forming titanate compound from titanate compound precursors includes a firing step separate from the sintering step involving the densification of the ceramic green bodies into ceramic bodies.

Without wishing to be bound by theory, the polycrystalline material may be self-milling as a result of the anisotropy in thermal expansion of the crystallites, or "grains." The particle size and/or PSD of the powder produced by this method is related to the grain size in the material. In some embodiments, the particle size is substantially the same as the grain size. In other embodiments, the particle size is substantially n times the grain size, where n is a number greater than zero. In some embodiments, n is between about 1 and about 100, such as between about 1 and about 50, between about 1 and about 20, between about 1 and about 10, between about 1 and about 5, between about 2 and about 10, or between about 2 and about 5.

According to various embodiments, the size of the grain depends on the size of the pellet or agglomerate of titanate compound precursor that is fired or calcined to form the titanate compound pellet or agglomerate.

Without wishing to be bound by theory, the grains may be separated along microcracks in the polycrystalline material. In some embodiments, the presence of titanate compound grains larger than a threshold size results in the separation of grains along micro-cracks. The threshold size may depend on the size of the titanate compound pellet or agglomerate, the chemical constituents of the titanate compound pellet or agglomerate, and/or the environment surrounding the grain, for example the proximity to pores or the amount of porosity. In addition, the amount of any additional metal, for example magnesium or iron, in the titanate compound material may affect the threshold size. In certain embodiments, a larger titanate compound pellet or aggregate requires a greater threshold size to generate enough stress among the grains to form microcracks. In some embodiments, the threshold size ranges from about 1 micron to about 10 microns, for example from about 1 micron to about 5 microns.

The energy required to break the polycrystalline material apart to the desired or controlled particle size may be supplied in part or as a whole by the strain energy induced by the anisotropic thermal expansion. Thus, in at least certain embodiments, very little external mechanical energy is needed to produce particles of a desired or controlled size. In various embodiments, the lack of an aggressive or energyintensive milling step may reduce the potential for contamination of the powder after calcination.

Because the titanate compound powders produced by various embodiments of the disclosure have a predetermined or controlled particle size and/or PSD, there is a reduced need for expensive machinery and/or processes to mill the powders to the required particle size and/or PSD. In at least some embodiments, the particle size and/or PSD of the titanate compound powder is independent of the milling process or technique.

According to various embodiments, titanate compound powders include pseudobrookite powders or titanate compounds having a pseudobrookite crystal structure. In some embodiments, titanate compound powders include at least one metal chosen from aluminum, magnesium, iron, or combinations thereof.

Titanate compound precursors according to various embodiments of the disclosure include compounds containing a first metal or metal oxide and compounds containing titanium. In some embodiments, titanate compound precursors include at least one compound containing an element chosen from aluminum, magnesium, iron, silicon, or combinations thereof. Applicants have found that the particle size of the titanate compound precursor materials does not affect the grain size or microcracking of the polycrystalline titanate compound material.

In various embodiments, the first metal or metal oxide is chosen from compounds containing aluminum. In some embodiments, the compounds containing aluminum are inorganic compounds containing aluminum, for example sources of alumina. Nonlimiting sources of alumina include, for example, calcined alumina, alpha-alumina, boehmite, kaolin, calcined kaolin, hydrated alumina, gibbsite, corundum, aluminum hydroxide, aluminum oxyhydroxide, and aluminum trihydrate. The kaolin and calcined kaolin are sources of silica in addition to alumina, and in some embodiments are added in limited amounts.

The compounds containing aluminum may be present in any amount suitable for the desired titanate compound material. In various embodiments, the compound containing aluminum is at least about 35 weight percent of the total inorganic portion of the mixture containing the titanate compound precursor, or the titanate compound precursor mixture. In some embodiments, the compound containing aluminum is at least about 40 weight percent, at least about 45 weight percent, at least about 50 weight percent, or at least about 55 weight percent of the total inorganic portion of the titanate compound precursor mixture. For example, in certain embodiments, the compound containing aluminum is about 45 weight percent, about 46 weight percent, about 47 weight percent, about 48 weight percent, about 49 weight percent, about 50 weight percent, about 51 weight percent, about 52 weight percent, about 53 weight percent, about 54 weight percent, or about 55 weight percent of the total inorganic portion of the titanate compound precursor mixture.

In various embodiments, the compounds containing titanium are inorganic compounds containing titanium, for example sources of titania. Nonlimiting sources of titania include, for example, titanium dioxide, rutile titanium dioxide, anatase titanium dioxide, and rutile ore. Rutile ore may be of lower cost than other sources of titania, but may, in some embodiments, include higher levels of impurities than other sources of titania.

The compounds containing titanium may be present in any amount suitable for the desired titanate compound material. In various embodiments, the compound containing titanium is at least about 35 weight percent of the total inorganic portion of the titanate compound precursor mixture. In some embodiments, the compound containing titanium is at least about 40 weight percent, at least about 45 weight percent, at least about 50 weight percent, or at least about 55 weight percent of the total inorganic portion of the titanate compound precursor mixture. For example, in certain embodiments, the compound containing titanium is about 41 weight percent, about 42 weight percent, about 43 weight percent, about 44 weight percent, about 45 weight percent, about 46 weight percent, about 47 weight percent, about 48 weight percent, about 49 weight percent, about 50 weight percent, or about 51 weight percent of the total inorganic portion of the titanate compound precursor mixture.

In some embodiments, at least one additional inorganic material is added to the titanate compound precursor mixture. Nonlimiting examples of additional inorganic materials include aluminum-containing compounds, magnesium-containing compounds, iron-containing compounds, magnesium and iron containing compounds, and mixtures thereof. In various embodiments of the disclosure, titanate compound precursor mixtures include both magnesium-containing compounds and iron-containing compounds. In at least certain embodiments, the polycrystalline titanate compound material has grains comprising aluminum titanate, magnesium dititanate, and iron titanate. Such polycrystalline titanate compound materials can be broken apart to provide titanate compound powders comprising particles comprising aluminum titanate, magnesium dititanate, and iron titanate.

The amount of magnesium and/or iron in the titanate compound precursor mixture may be used to control the grain size in the polycrystalline titanate compound material and/or the particle size and/or particle size distribution of the titanate compound powder resulting from the breaking apart of the polycrystalline titanate compound material.

In certain embodiments, a magnesium-containing compound such as magnesium hydroxide, talc, calcined talc, magnesium oxide, magnesium carbonate, magnesium aluminate spinel, brucite, or a combination thereof is added to the titanate compound precursor mixture. The talc and calcined talc are sources of silica in addition to magnesium, and in some embodiments are added in limited amounts. Brucite may be of lower cost than other sources of magnesium.

After calcining the titanate compound precursor mixture, a polycrystalline material having grains comprising a titanate compound and magnesium dititanate ("MT2") is formed. In some embodiments, the titanate compound is aluminum titanate ("AT"), and the polycrystalline material has grains comprising AT and MT2.

The magnesium-containing compound may be present in the titanate compound precursor mixture in any suitable amount based on the desired content of MT2 in the polycrystalline titanate compound material, the desired grain size or grain size distribution of the polycrystalline titanate compound material, and/or the desired particle size or particle size distribution of the titanate compound powder resulting from the breaking apart of the polycrystalline titanate compound material. In various embodiments of the disclosure, the magnesium-containing compound is present in an amount ranging up to about 30 weight percent, such as about 1 weight percent to about 20 weight percent, or about 2 weight percent to about 10 weight percent, based on the total weight of inorganic compounds in the titanate compound precursor mixture. In some embodiments, the amount of magnesium-containing compound is about 0 percent, about 0.5 weight percent, about 1 weight percent, about 2 weight percent, about 3 weight percent, about 5 weight percent, about 8 weight percent, about 10 weight percent, about 15 weight percent, or about 20 weight percent, based on the total weight of inorganic compounds in the titanate compound precursor mixture.

In other embodiments, an iron-containing compound such as iron oxide, hematite, and ilmenite is added to the titanate compound precursor mixture. After calcining the titanate compound precursor mixture, a polycrystalline material having grains comprising titanate compound and iron titanate is formed.

The iron-containing compound may be present in the titanate compound precursor mixture in any suitable amount based on the desired content of iron titanate in the polycrystalline titanate compound material, the desired grain size or grain size distribution of the polycrystalline titanate compound material, and/or the desired particle size or particle size distribution of the titanate compound powder resulting from the breaking apart of the polycrystalline titanate compound material. In various embodiments of the disclosure, the iron-containing compound is present in an amount ranging up to about 4 weight percent, about 1 weight percent to about 4 weight percent, or about 2 weight percent to about 3 weight percent, based on the total weight of inorganic compounds in the titanate compound precursor mixture. In some embodiments, the amount of iron-containing compound is about 0 percent, about 0.5 weight percent, about 1 weight percent, about 1.5 weight percent, about 2 weight percent, about 2.5 weight percent, about 3 weight percent, about 3.5 weight percent, or about 4 weight percent, based on the total weight of inorganic compounds in the titanate compound precursor mixture.

According to some embodiments of the disclosure, the titanate compound precursor mixture comprises a silica compound, for example a colloidal silica. In some embodiments, the polycrystalline titanate compound material has grains comprising aluminum titanate and silica. Such polycrystalline titanate compound materials can be broken apart to provide titanate compound powders having particles comprising aluminum titanate and silica.

The presence of colloidal silica in the titanate compound precursor mixture may dampen the effect of the amount of magnesium and/or iron on the grain size of the polycrystalline titanate compound material and/or the particle size and/or PSD of the titanate compound powder resulting from the breaking apart of the polycrystalline titanate compound material. Thus, in certain embodiments, the median particle size of a titanate compound powder resulting from the breaking apart of a polycrystalline titanate compound material containing silica may not be strongly correlated, or not at all correlated, with the amount of magnesium and/or iron in the titanate compound powder.

According to various embodiments, the titanate compound precursor mixture includes components that would form glasses during sintering. Without wishing to be bound by theory, glassy phases such as colloidal silica may influence the sintering and grain growth kinetics of the polycrystalline titanate compound material. In certain embodiments, other glassy phases, such as calcium, boron, sodium, potassium, cerium, lanthanum, other rare earth elements, or combinations thereof may be used.

In some embodiments, the titanate compound precursor mixture includes components that would form crystalline phases during or after sintering. Crystalline phases such as silica or silicates may influence sintering and grain growth kinetics of the polycrystalline titanate compound material in certain embodiments.

The colloidal silica may be present in any suitable amount. In various embodiments, the colloidal silica is present as a superaddition in an amount ranging up to about 5 weight percent, such as about 1 weight percent to about 4 weight percent, or about 2 weight percent to about 4 weight percent, based on 100 weight percent of the total inorganic portion of the titanate compound precursor mixture. In certain embodiments, the colloidal silica is present as a superaddition in an amount of about 0 weight percent, about 0.5 weight percent, about 1 weight percent, about 2 weight percent, about 3 weight percent, about 4 weight percent, or about 5 weight percent, based on 100 weight percent of the total inorganic portion of the titanate compound precursor mixture.

The titanate compound precursor mixture may include at least one binder. The binder may be an organic binder or an inorganic binder. In some embodiments, the titanate compound precursor mixture does not include a binder. According to some embodiments, the binder is a thermally sensitive binder. In other embodiments, the binder does not need to be a thermally sensitive binder.

In some embodiments, the titanate compound precursor mixture includes an organic binder. In certain embodiments, the organic binder is a cellulose or a cellulose derivative. Nonlimiting examples of organic binders include modified starches, gluten, natural gums, polyethylene oxide, polyvinylpyrrolidone, methylcellulose and hydroxypropyl methylcellulose, for example Methocel® A4M.

In other embodiments, the titanate compound precursor mixture includes an inorganic binder. In certain embodiments, the inorganic binder is find, colloidal silica, colloidal alumina, clay-type materials, or combinations thereof.

In various embodiments, the binder may be present as a superaddition in an amount ranging from zero to about 10 weight percent, such as about 0.1 weight percent to about 5 weight percent, about 0.2 weight percent to about 3 weight percent, about 0.3 weight percent to about 2 weight percent, about 0.3 weight percent to about 1.5 weight percent, about 0.3 weight percent to about 1 weight percent, or about 0.4 weight percent to about 0.8 weight percent, based on 100 weight percent of the total inorganic portion of the titanate compound precursor mixture. For example, the binder may be present as a superaddition in an amount of about 0.1 weight percent, about 0.2 weight percent, about 0.3 weight percent, about 0.4 weight percent, about 0.5 weight percent, about 0.6 weight percent, or about 0.7 weight percent, based on 100 weight percent of the total inorganic portion of the titanate compound precursor mixture.

The titanate compound precursor mixture may optionally further include other additives, for example rheology modifiers, dispersants, surfactants, or lubricants. Nonlimiting examples of additives include fatty acids and tall oil. In some embodiments, the titanate compound precursor mixture does not include other additives.

The titanate compound precursor mixture may be calcined as a batch, or the mixture may be formed into at least one shaped or unshaped body before calcination. In various embodiments, the mixture may be extruded, uniaxial or isostatic cold-pressed, rolled, spray dried, calendered, and/or pressed into at least one shaped or unshaped body before calcination. The mixture may be formed into a plurality of bodies having substantially uniform dimensions for uniform calcination of each body. In certain embodiments, the mixture is formed into pellets prior to calcination. In some embodiments, the size of the grain is controlled by the size of the shaped or unshaped body before calcination. In some embodiments, a larger shaped or unshaped body before calcination results in a larger grain size in the polycrystalline material.

The heating rate during the calcination may be, in some embodiments, greater than about 1° C./min. In certain embodiments, the heating rate during the calcination is greater than about 2° C./min, about 3° C./min, about 4° C./min, about 5° C./min, about 6° C./min, or 7° C./min. In some embodiments, the heating rate may be up to about 100° C./min or 1000° C./min.

The titanate compound precursor mixture may be calcined at a maximum temperature, or "top soak" temperature, of at least about 1200° C., for example from about 1200° C. to about 2000° C., from about 1250° C. to about 1700° C., from about 1300° C. to about 1700° C., from about 1400° C. to about 1800° C., from about 1400° C. to about 1700° C., from about 1450° C. to about 1700° C., from about 1500° C. to about 1700° C., or from about 1500° C. to about 1650° C. In some embodiments, the titanate compound precursor mixture is calcined at a temperature of about 1450° C., about 1500° C., about 1550° C., about 1600° C., about 1650° C., or about 1700° C.

The titanate compound precursor mixture may be calcined for a time known as the calcination time. The calcination time is the time the titanate compound precursor is held at the maximum temperature, or top soak temperature, and does not include the time spent heating the titanate compound precursor to the maximum temperature, or the time spent cooling the titanate compound precursor from the maximum temperature. In various embodiments, the calcinations time is at least about 0.5 hours or at most about 30 hours, for example from about 1 hour to about 30 hours, from about 1 hour to about 25 hours, from about 1 hour to about 10 hours, from about 1 hour to about 5 hours, from about 1 hour to about 4 hours, or from about 1 hour to about 3 hours. In some embodiments, the titanate compound precursor mixture is calcined for a time of about 0.5 hours, about 1 hour, about 1.5 hours, about 2 hours, about 2.5 hours, or about 3 hours.

The cooling rate during the calcination may be, in some embodiments, greater than about 1° C./min. In certain embodiments, the heating rate during the calcination is greater than about 10° C./min, about 50° C./min, about 100° C./min, about 200° C./min, about 300° C./min, about 400° C./min, about 500° C./min, about 600° C./min, about 700° C./min, about 800° C./min, about 900° C./min, or about 1000° C./min.

During the calcination step, the titanate compound precursor mixture forms a polycrystalline titanate compound material having a plurality of titanate compound grains. In various embodiments of the disclosure, the polycrystalline titanate compound material has grains of a particular size and/or size distribution based on the time and temperature of the calcination step. In certain embodiments, the particular size and/or size distribution of the grains is predetermined based on the time and temperature of the calcination step, and the composition of the titanate compound precursor mixture, such that the grain size and/or size distribution is controlled and/or controllable.

The polycrystalline titanate compound material also includes a plurality of microcracks. In various embodiments, a portion of the titanate compound grains are separated by the microcracks. In some embodiments, at least about 20% of the titanate compound grains are separated by microcracks, for example from about 20% to about 100%, from about 25% to about 95%, from about 30% to about 90%, from about 35% to about 85%, from about 40% to about 80%, or from about 50% to about 75%. In various embodiments, at least about 30%, at least about 40%, at least about 50%, at least about 60%, at least about 70%, at least about 80%, at least about 85%, at least about 90%, or at least about 95% of the titanate compound grains are separated by microcracks.

The polycrystalline titanate compound material may be broken apart by any known method to form a titanate compound powder. In various embodiments, the polycrystalline titanate compound material is broken along at least a portion of the microcracks to provide a titanate compound powder having titanate compound particles with a controlled particle size and/or PSD. In some embodiments, the titanate compound particle includes microcracks, i.e., the titanate compound material is not broken apart along all of the microcracks.

According to various embodiments, at least one surface of the titanate compound particle is a microcrack fractured surface. In some embodiments, at least one surface of the titanate compound particle is an abraded surface, i.e., at least part of the titanate compound material may be broken apart at locations other than microcracks.

In various embodiments, the method used to break apart the polycrystalline titanate compound material does not affect the particle size and/or PSD of the resulting titanate compound powder. Methods of breaking apart the polycrystalline titanate compound material include but are not limited to milling, ball milling, sonicating, disc pulverizing, and using a handheld pestle and mortar.

Various methods of the disclosure provide titanate compound powders having a median particle size ($d_{50}$) ranging from about 1 μm to about 100 μm, for example from about 5 μm to about 60 μm, or from about 10 μm to about 50 μm.

Various methods of the disclosure provide titanate compound powders having a controlled particle size distribution ("PSD").

According to various embodiments, titanate compound powders have a $d_{10}$ ranging from about 1 μm to about 80 μm, for example from about 5 μm to about 60 μm, from about 10 μm to about 50 μm, from about 12 μm to about 25 μm, or from about 15 μm to about 20 μm.

In various embodiments, titanate compound powders have a $d_{90}$ ranging from about 1 μm to about 200 μm, for example from about 5 μm to about 150 μm, from about 10 μm to about 100 μm, from about 20 μm to about 80 μm, from about 40 μm to about 70 μm, or from about 50 μm to about 60 μm.

According to various embodiments, the $D_{breadth}$, defined as $(d_{90}-d_{10})/d_{50}$, of the titanate compound powders ranges from about 0.5 to about 2.0, from about 0.8 to about 1.8, from about 0.9 to about 1.6, from about 1.0 to about 1.5, from about 1.0 to about 1.4, from about 1.1 to about 1.4, from about 1.1 to about 1.3, from about 1.2 to about 1.4, from about 1.2 to about 1.3, from about 0.8 to about 1.2, from about 0.9 to about 1.1, from about 1.0 to about 1.2, or from about 1.1 to about 1.2. Such narrow particle size distributions are difficult to achieve by conventional milling methods.

Titanate compound powders having a controlled particle size and/or particle size distribution provided by the above methods may be used to prepare a ceramic batch composition. In some embodiments, the ceramic batch composition includes particles having a controlled particle size and/or particle size distribution and comprising a compound chosen from aluminum titanate, magnesium titanate, iron titanate, and combinations thereof. In certain embodiments, the particles further comprise silica.

The ceramic batch composition may be formed into a green ceramic body and fired to produce a ceramic body by any known method. In some embodiments, the ceramic batch composition includes inorganics, organics, solvent, and the titanate compound. According to various embodiments, the ceramic batch composition includes at least one pore former. In other embodiments, the ceramic batch composition includes no pore former.

According to certain embodiments, firing of the green ceramic body results in densification of the green ceramic body in addition to reaction of at least one precursor material to form the final ceramic body material. In other embodiments, firing of the green ceramic body results in densification of the green ceramic body, and the titanate compound does not need to be formed during firing of the green ceramic body. In these embodiments, the green ceramic body is fired without in situ formation of the titanate compound. In some embodiments, the use of titanate compound in the ceramic batch compositions can result in less consolidation or shrinkage during the firing of the green ceramic body.

According to various embodiments, the ceramic batch composition including at least one titanate compound includes at least one pore former. Due to the reduced shrinkage of the green ceramic body during firing, a reduced amount of pore former is necessary than in a ceramic batch composition using titanate compound precursors. In certain embodiments, the use of at least one titanate compound having a particular particle size distribution in the ceramic batch composition and a reduced amount of pore former can result in a higher porosity material than possible with a ceramic batch composition using titanate compound precursors and a greater amount of pore former.

In various embodiments, the ceramic batch composition may be extruded into a green ceramic body. In some embodiments, the green ceramic body is fired to prepare a ceramic article having a coefficient of thermal expansion ("CTE") ranging up to about $25 \times 10^{-7}/°$ C. over a range of from about room temperature to about 800° C., for example up to about $15 \times 10^{-7}/°$ C., about $1 \times 10^{-7}/°$ C. to about $10 \times 10^{-7}/°$ C., or about $1 \times 10^{-7}/°$ C. to about $5 \times 10^{-7}/°$ C. over a range of from about room temperature to about 800° C.

In some embodiments, the ceramic batch composition may be used as a ceramic plug or a ceramic skin for application to another ceramic article.

The effects of various parameters in preparing titanate compound powders by the above methods are illustrated in the Examples below. The variable parameters may include (1) calcination temperature; (2) calcination time; (3) colloidal silica addition; (4) MT2 level. The effects of each of these parameters on the PSDs of titanate compound powders produced are described below.

EXAMPLES

The following examples are not intended to be limiting of the disclosure.

Example 1

To further illustrate the principles of the disclosure, several titanate compound powders comprising aluminum titanate ("AT") were prepared by the methods disclosed above. Table 1 lists the parts by weight of the raw materials used to make the examples.

TABLE 1

| | | Batch Number | | | | |
|---|---|---|---|---|---|---|
| | Material | 1 | 2 | 3 | 4 | 5 |
| Inorganics | Calcined Alumina - A10 325 | 50.866 | 50.866 | 50.866 | 40.349 | 50.866 |
| | Titanium Dioxide - Ti-Pure R101 | 46.896 | 46.896 | 46.896 | 52.317 | 46.896 |
| | Magnesium Hydroxide - Magshield UF | 2.238 | 2.238 | 2.238 | 7.334 | 2.238 |
| Binder | Hydosypropyl Methylcellulose - Methocel A4M | 0.5 | 0.5 | 0.5 | 0.5 | 0.5 |
| Additives | Fatty Acid, Tall Oil - L-5 | 1 | 1 | 1 | 1 | 1 |
| Silica | Colloidal Silica - Ludox TMA | 0 | 1 | 0 | 0 | 1 |
| | Total | 101.5 | 102.5 | 101.5 | 101.5 | 102.5 |

| | | Batch Number | | | |
|---|---|---|---|---|---|
| | Material | 6 | 7 | 8 | 9 |
| Inorganics | Calcined Alumina - A10 325 | 46.31 | 40.349 | 46.31 | 40.349 |
| | Titanium Dioxide - Ti-Pure R101 | 49.24 | 52.317 | 49.24 | 52.317 |
| | Magnesium Hydroxide - Magshield UF | 4.44 | 7.334 | 4.44 | 7.334 |
| Binder | Hydosypropyl Methylcellulose - Methocel A4M | 0.5 | 0.5 | 0.5 | 0.5 |
| Additives | Fatty Acid, Tall Oil - L-5 | 1 | 1 | 1 | 1 |

TABLE 1-continued

| Silica | Colloidal Silica - Ludox TMA | 1 | 1 | 0 | 0 |
|---|---|---|---|---|---|
| | Total | 102.5 | 102.5 | 101.5 | 101.5 |

The inorganic raw materials (alumina, titanium dioxide, and magnesium hydroxide) along with the organic binder (Methocel® A4M) were mixed using a Littleford® mixer, and subsequently extruded into pellets using a 40 mm twin screw extruder. The pellets were then calcined in a box furnace, using small alumina boats. Calcined pellets were subsequently broken down using various means and particle size distribution ("PSD") of the powders was measured to investigate the effects of the batch chemistry and processing conditions on the particle size and PSD of the resulting powders.

Figure 1A:
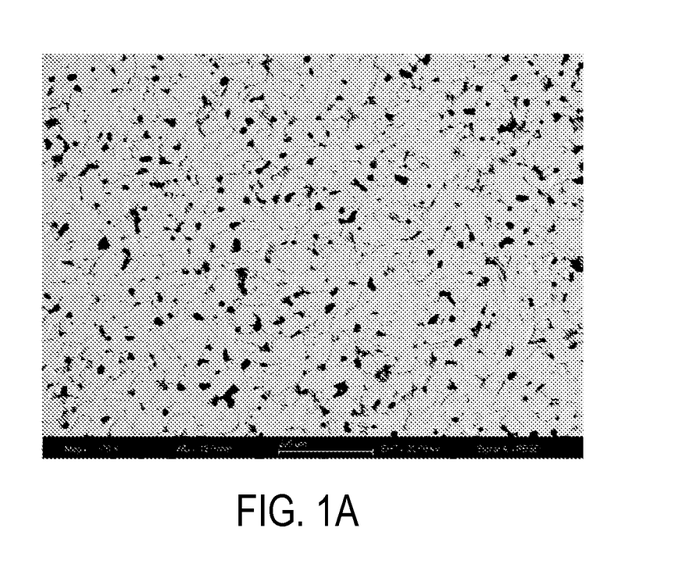
FIGS. 1A and 1B are scanning electron micrographs of polished cross sections of aluminum titanate agglomerate particles according to an embodiment of the disclosure.
Figure 1B:
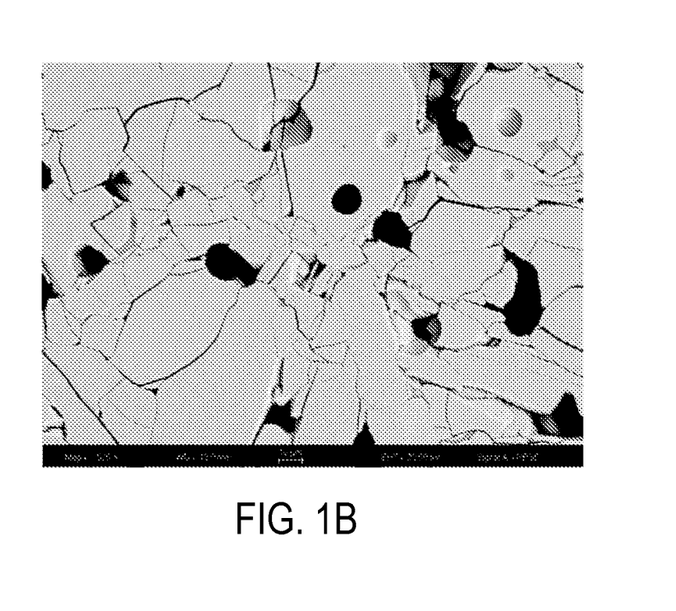

FIGS. 1A and 1B show scanning electron micrograph ("SEM") images of polished cross-section of a polycrystalline AT material having a composition of Batch 2 as outlined in Table 1 at 100× and 500× magnification, respectively. Microcracks separating individual grains are evident. Also evident is a relatively narrow grain size distribution.

Figure 2A:
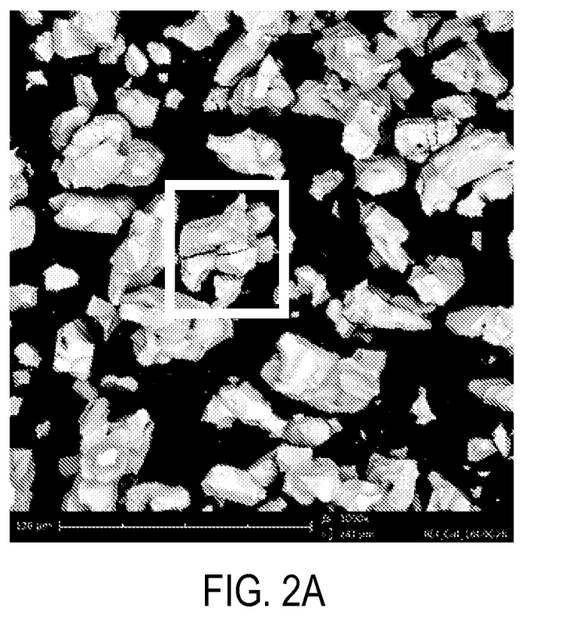
FIGS. 2A and 2B are scanning electron micrographs of aluminum titanate powder particles according to an embodiment of the disclosure.
Figure 2B:
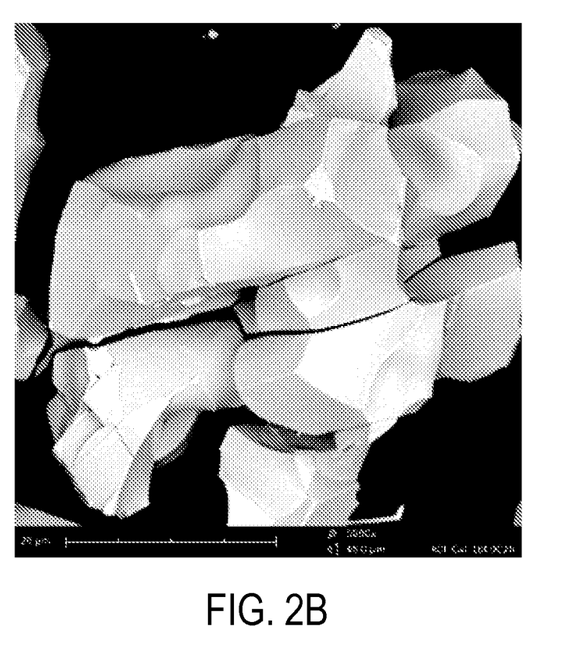

FIGS. 2A and 2B show SEM images of AT powder particles having a composition of Batch 2 as outlined in Table 1 at 1000× and 5000× magnification, respectively. The AT powder particles shown in FIGS. 2A and 2B are the result of polycrystalline AT materials crushed by a hand held pestle and mortar. As shown in FIG. 2B in particular, microcracks appear to be separating individual grains. In addition, at least a portion of the surface of the particle is a microcrack fractured surface. Also evident is a relatively narrow particle size distribution that is substantially proportional to the grain size distribution shown in FIGS. 1A and 1B.

Figure 3:
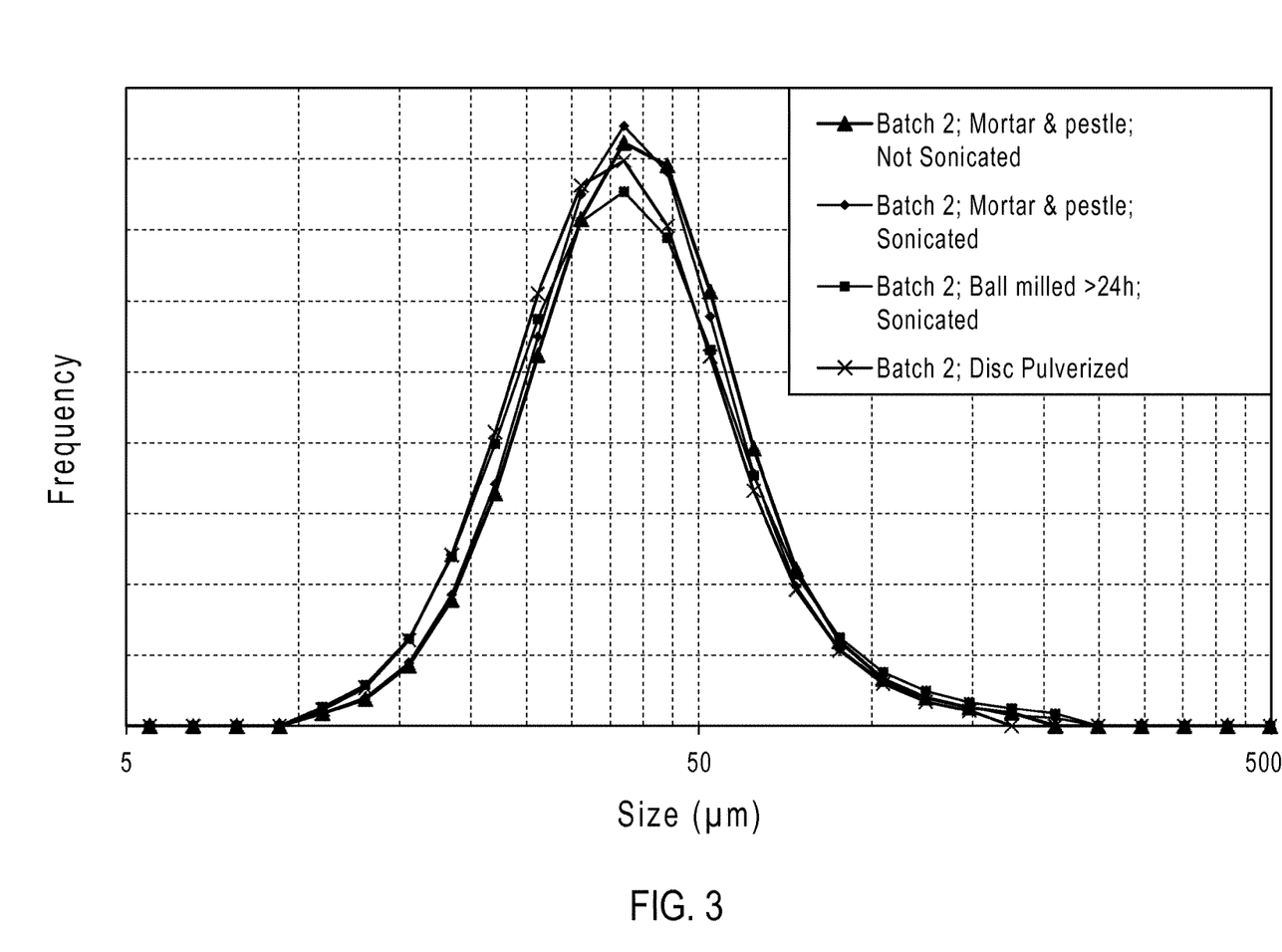
FIG. 3 is a graph showing the particle size distributions of aluminum titanate powders milled by various techniques according to embodiments of the disclosure.

FIG. 3 shows the particle size distribution for AT powders obtained by milling a polycrystalline AT material of Batch 2 (calcined at 1600° C. for 2 hours) by four techniques, including mortar and pestle, mortar and pestle followed by sonication, ball milling followed by sonication, and disc pulverizing (e.g., Bico). As shown in FIG. 3, the PSD remains consistent among various milling techniques. This suggests that the grains in the polycrystalline AT materials preferentially separate along microcracks, irrespective of the specific milling method used. Also observed was that only gentle communition methods, for example low energy attrition milling, is required to break apart the polycrystalline AT materials.

Figure 4:
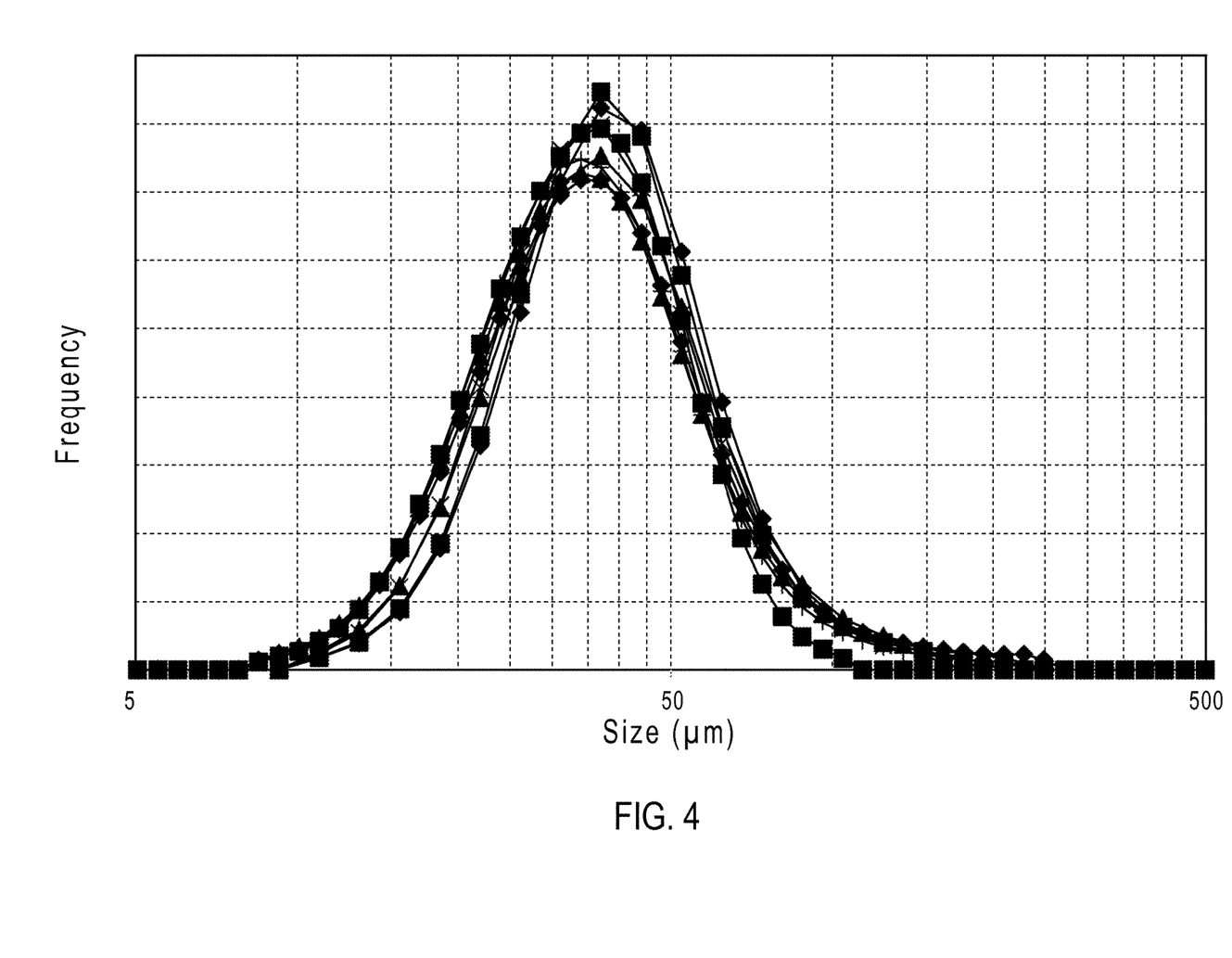
FIG. 4 is a graph showing the particle size distributions of aluminum titanate powders according to various embodiments of the disclosure.

FIG. 4 shows the particle size distribution for 15 lots of Batch 1, calcined under the same conditions. All lots were milled using a disc pulverizer. As shown in FIG. 4, the particle size distribution remains consistent for each of the 15 lots. This suggests that the particle size distribution is repeatable for a given chemistry, calcination temperature, and calcination time.

Figure 5:
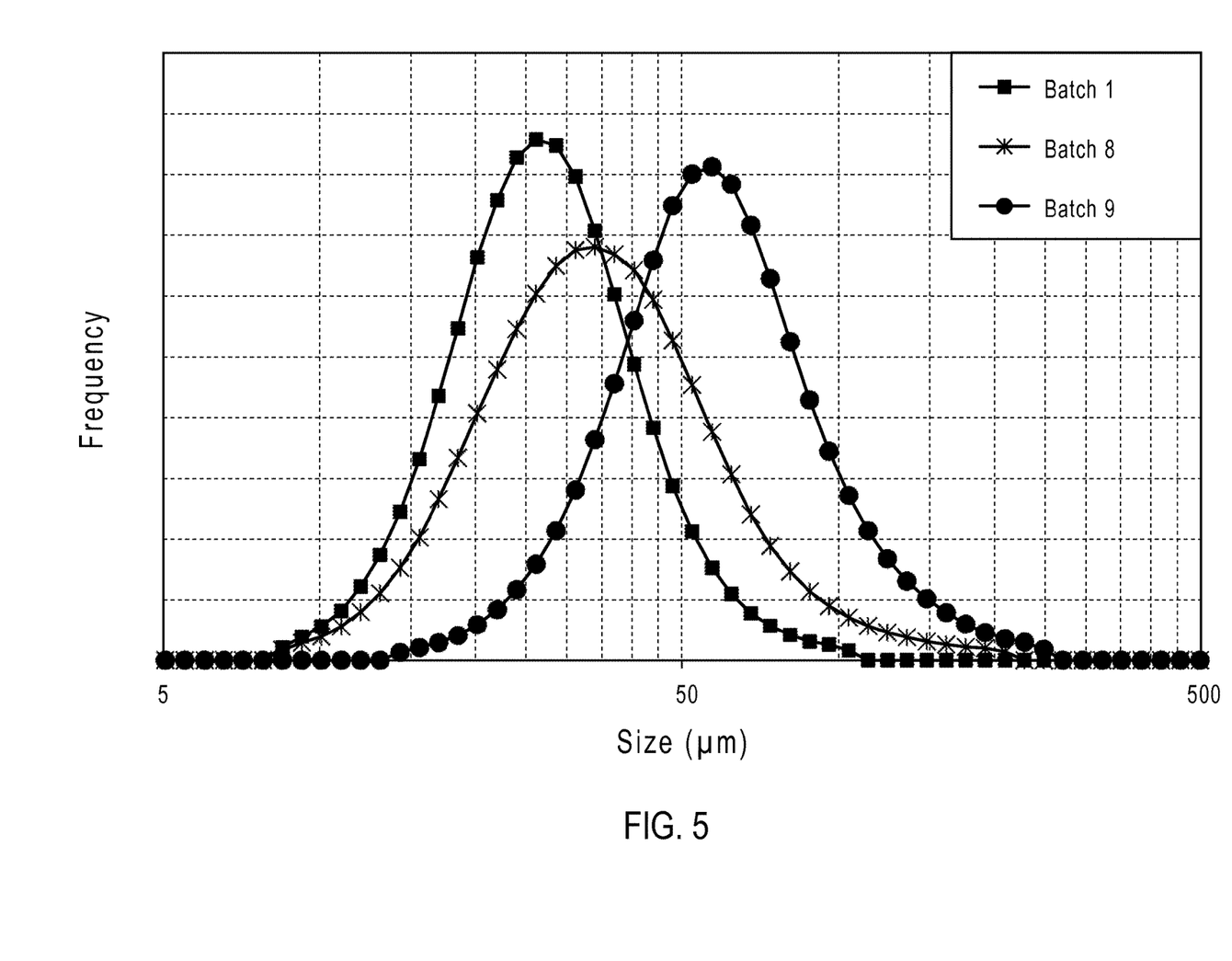
FIG. 5 is a graph illustrating the effect of calcination time, temperature, and chemistry on the median particle size ($d_{50}$) of an aluminum titanate powder.

FIG. 5 shows the particle size distribution for AT powders obtained by milling a polycrystalline AT material of Batches 1, 8, and 9 (calcined at 1600° C. for 2 hours), respectively. The median particle size ($d_{50}$) increases with increasing MT2 content. The particle size distribution is also affected by MT2 content.

Figure 6:
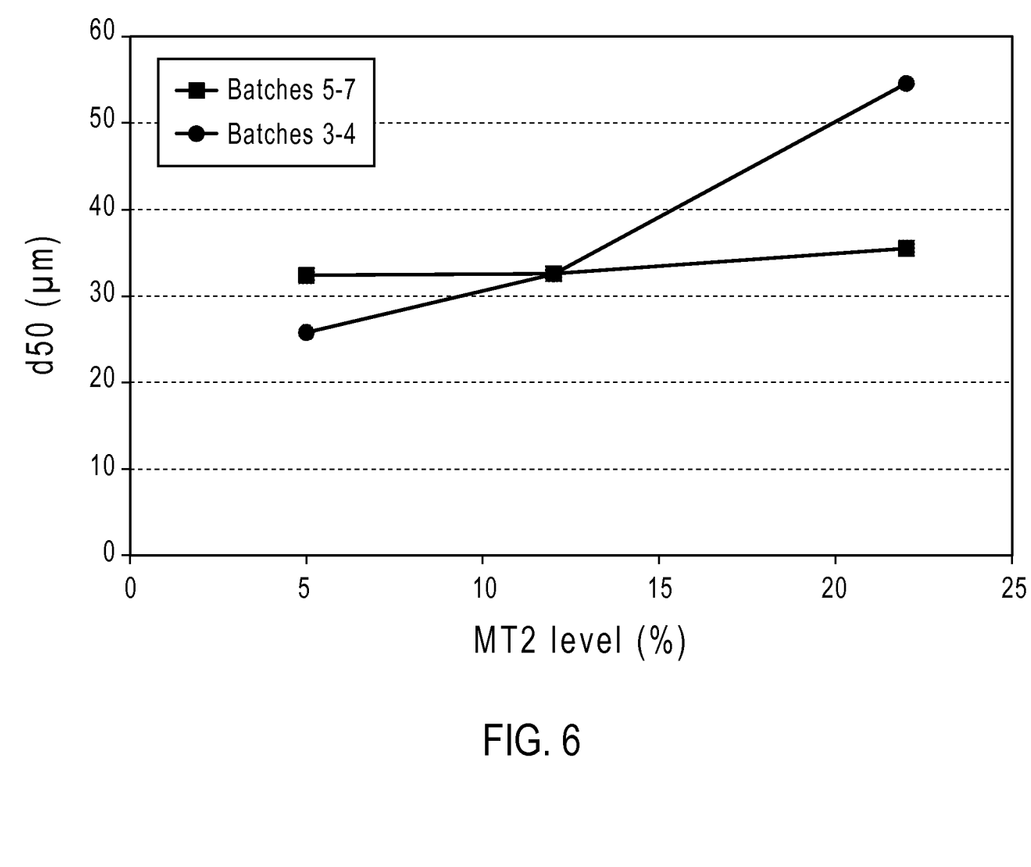
FIG. 6 is a graph illustrating the effect of magnesium concentration on the particle size distribution of an aluminum titanate powder.

FIG. 6 is a graph showing the median particle size for AT powders obtained by milling a polycrystalline AT material of Batches 3-7 (calcined at 1600° C. for 2 hours, with a heating rate of 400° C./hr), respectively. As shown in FIG. 6, the median particle size ($d_{50}$) increases for increasing MT2 levels for Batches 3 and 4. However, the presence of silica in Batches 5-7 appears to at least diminish the effect of MT2 level on the median particle size of the AT powder. Thus, Batches 5 and 6 have approximately the same median particle size despite having a different amount of MT2. Batch 7 shows only a slight increase in median particle size over Batches 5 and 6, despite having a larger amount of MT2.

Figure 7:
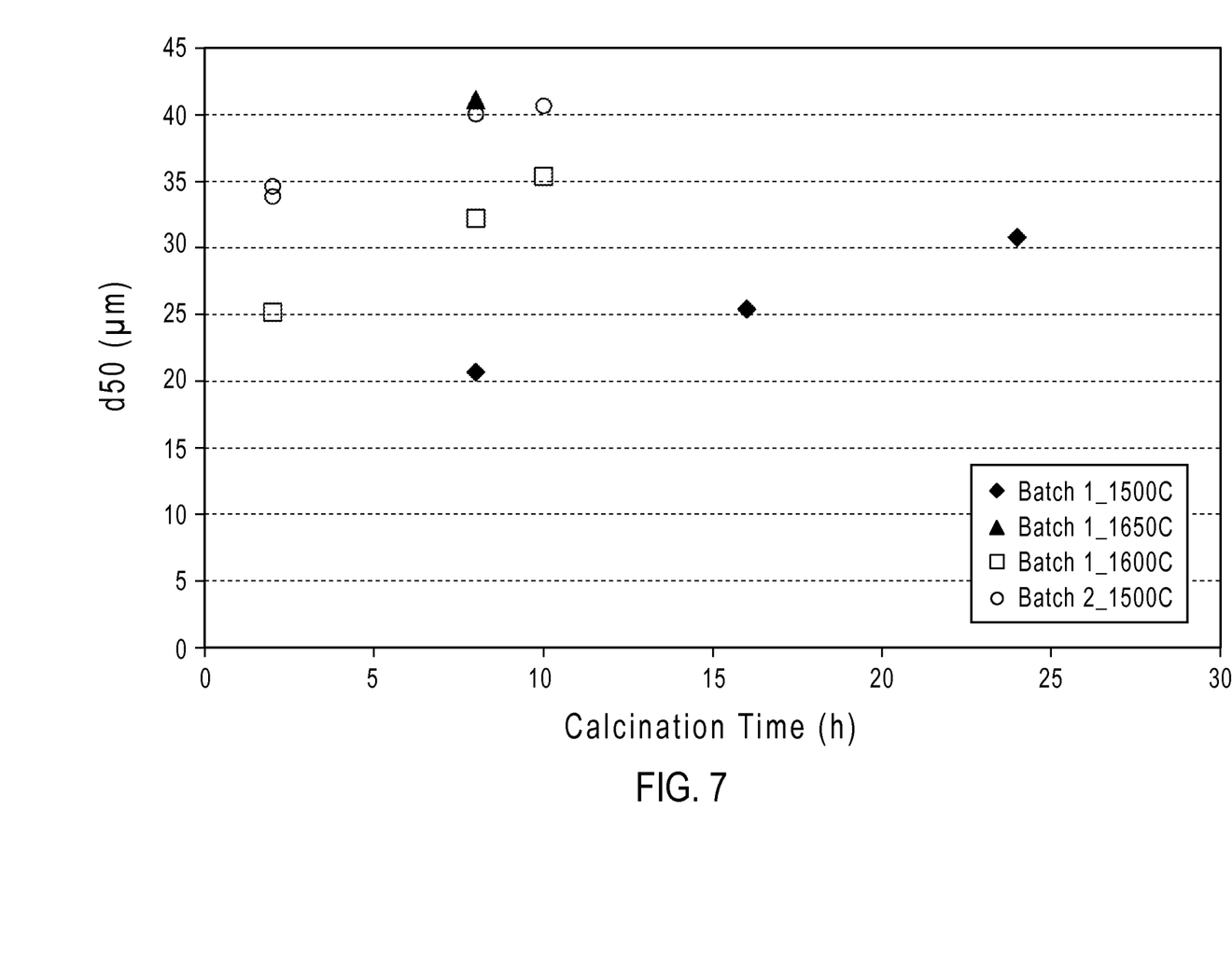
FIG. 7 is a graph illustrating the effect of magnesium concentration and the presence of silica on the median particle size ($d_{50}$) of an aluminum titanate powder.

FIG. 7 is a graph showing the effect of batch chemistry and calcination time and temperature on the median particle size AT powders obtained by milling a polycrystalline AT material of Batches 1 and 2.

Calcination temperature was found to have a strong influence on the median particle size ($d_{50}$) of AT powders produced, as shown in FIG. 7. Higher calcination temperatures lead to coarser particle sizes. However, this parameter was found to be effective only in the non-silica containing compositions (Batch 1), while the silica containing composition (Batch 2) were found to be virtually insensitive to calcination temperature.

Calcination time was another parameter that influenced the powder particle size. Increasing calcination time leads to larger grain sizes and hence coarse powders, as shown in FIG. 7. This variable was found to have a stronger influence on the non-silica containing compositions (Batch 1) than the silica containing compositions (Batch 2).

Colloidal silica containing composition (Batch 2) was found to produce coarser particles than its silica-less counterpart (Batch 1). However, it was also found to be less sensitive to calcination time and temperature as mentioned above.

Example 2

Several pure AT powders having the same composition were prepared by the methods disclosed below, and calcined at different heating rates.

A mixture of 55.35% calcined alumina and 44.65% titanium dioxide, with 3.64% superaddition of Hydroxypropyl Methylcellulose—F240 LF was dry-blended. 10.5% water was added, and the resulting mixture was extruded in a twin-screw extruder. The extrudate was dried before firing at different heating rates. For the 50° C./hr and 5° C./hr conditions, the heating rate from room temperature to 1000° C. was 300° C./hr and the slower rate was used from 1000° C. to the maximum temperature of 1600° C. The extrudate was held at the maximum temperature for 2 hours. All conditions used a 300° C./hr cooling rate.

Table 2 shows the effect of heating rate on the particle size distribution of AT powders, along with XRD data. In all cases, the predominant phase is aluminum titanate in all cases. The material was hand-ground in a mortar and pestle before measuring particle size.

TABLE 2

| Sample | Heating Rate | $d_{10}$ (μm) | $d_{50}$ (μm) | $d_{90}$ (μm) | $D_{breadth}$ | XRD |
|---|---|---|---|---|---|---|
| A | 500° C./hr | 10 | 17 | 31 | 1.2 | No rutile peak |
| B | 400° C./hr | 12 | 21 | 40 | 1.3 | No rutile peak |
| C | 200° C./hr | 12 | 23 | 45 | 1.4 | No rutile peak |
| D | 100° C./hr | 13 | 24 | 45 | 1.4 | No rutile peak |
| E | 50° C./hr | 14 | 30 | 106 | 3.0 | Rutile peak |
| F | 5° C./hr | 18 | 41 | 100 | 2.0 | No rutile peak |

As shown in Table 2, slower heating rates resulted in larger particle size distributions. In particular, Sample E having a heating rate of 50° C./hr had a $D_{breadth}$ of 3.0, the largest $D_{breadth}$ of the samples. Sample F having a heating rate of 5° C./hr also had a large $D_{breadth}$, 2.0. Samples A-D, each having a heating rate of at least 100° C./hr each had a $D_{breadth}$ of 1.4 or less.

In addition, slower heating rates resulted in larger particle sizes. Samples E and F had much larger median particle sizes ($d_{50}$), at 30 μm and 41 μm, respectively, than Samples A-D having a heating rate of at least 100° C./hr and a median particle size of 17-24 μm. The $d_{90}$ of Samples E and F, at 106 μm and 100 μm, respectively, were far larger than the $d_{90}$ of Samples A-D, at 31-45 μm.

The presence of the rutile peak is an indication of the presence of unreacted rutile phase material. A sample having an XRD spectrum with no rutile peak indicates a more complete reaction than a sample having an XRD spectrum with a rutile peak. Samples A-D, each having a heating rate of at least 100° C./hr exhibited no rutile peak, indicating a substantially complete reaction.

Example 3

Several AT/MT2 powders having the composition of Batch 1 were prepared by the methods of Example 1, and calcined at different heating rates.

For the 50° C./hr sample, the heating rate from room temperature to 1000° C. was 300° C./hr and the slower rate was used from 1000° C. to the maximum temperature of 1600° C. The extrudate was held at the maximum temperature for 2 hours. All conditions used a 300° C./hr cooling rate.

Table 3 shows the effect of heating rate on the particle size distribution of AT/MT2 powders, along with XRD data. In all cases, the predominant phase is aluminum titanate in all cases. The material was hand-ground in a mortar and pestle before measuring particle size.

TABLE 3

| Sample | Heating Rate | $d_{10}$ (μm) | $d_{50}$ (μm) | $d_{90}$ (μm) | $D_{breadth}$ | XRD |
|---|---|---|---|---|---|---|
| G | 400° C./hr | 14 | 22 | 37 | 1.0 | No rutile peak |
| H | 200° C./hr | 16 | 25 | 40 | 1.0 | No rutile peak |
| I | 100° C./hr | 16 | 26 | 42 | 1.0 | No rutile peak |
| J | 50° C./hr | 19 | 30 | 48 | 1.0 | Trace Alumina |

As shown in Table 3, heating rate had a lesser effect on the particle size distributions for AT/MT2 samples than for the pure AT samples disclosed in Example 2. In particular, AT/MT2 Samples G-J having a heating rate of between 50° C./hr and 400° C./hr each had a $D_{breadth}$ of 1.0, which is smaller than any of pure AT Samples A-F.

In addition, heating rate had a lesser effect on the particle size for AT/MT2 samples than for the pure AT samples disclosed in Example 2. In particular, AT/MT2 Samples G-I having a heating rate of between 100° C./hr and 400° C./hr each had a median particle size ($d_{50}$) between 22 μm and 26 μm, whereas Sample J having a heating rate of 50° C./hr and a median particle size of 30 μm. The $d_{90}$ of AT/MT2 Samples G-I, at 37-48 μm, were comparable to the $d_{90}$ of Samples A-D, at 31-45 μm.

The heating rate did affect the reaction completeness of the AT/MT2 samples. Sample J, having a heating rate of 50° C./hr, exhibited trace alumina, which indicates a slight amount of unreacted raw material. Samples G-I, having a heating rate of at least 100° C./hr, each exhibited no rutile peak, indicating a substantially complete reaction.

Unless otherwise indicated, all numbers used in the specification and claims are to be understood as being modified in all instances by the term "about," whether or not so stated. It should also be understood that the precise numerical values used in the specification and claims form additional embodiments of the disclosure. Efforts have been made to ensure the accuracy of the numerical values disclosed in the Examples. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary.

As used herein, the term "at least one" means "one or more," for example one, two, several, many, or all.

As used herein, the term "and/or" means at least one of the options, but can include more than one of the options, for example one, two, several, many, or all of the options.

It is to be understood that both the foregoing general description and the detailed description are exemplary and explanatory only and are not intended to be restrictive.

The accompanying figures, which are incorporated in and constitute a part of this specification, are not intended to be restrictive, but rather illustrate embodiments of the disclosure.

Other embodiments will be apparent to those skilled in the art from consideration of the specification and practice of the disclosure.

What is claimed is:

1. A method for preparing aluminum titanate compound powder, the method comprising:
   mixing at least one first inorganic compound chosen from sources of alumina, at least one second inorganic compound chosen from sources of titania, and at least one binder to form a mixture;
   calcining the mixture at a temperature for an amount of time to form a polycrystalline material comprising a plurality of aluminum titanate compound grains, wherein the polycrystalline material further comprises a plurality of microcracks; and
   breaking the polycrystalline material apart along at least a portion of the microcracks by energy at least partially supplied by strain energy induced by anisotropic thermal expansion to provide aluminum titanate particles wherein the polycrystalline material is broken apart to a predetermined controlled particle size having a median particle size ranging from 1 μm to 100 μm and particle size distribution having $D_{breadth}$ ranging from 0.5 to 2.0 independent of a milling process used, wherein $D_{breadth}$ is $(d_{90}-d_{10})/d_{50}$.

2. The method according to claim 1, wherein the mixture further comprises at least one compound chosen from magnesium compounds, iron compounds, and combinations thereof.

3. The method according to claim 2, wherein the polycrystalline material comprises grains of compounds chosen from magnesium dititanate, iron titanate, and combinations thereof.

4. The method according to claim 1, wherein the mixture further comprises at least one silica component.

5. The method according to claim 4, wherein the at least one silica component is chosen from colloidal silica.

6. The method according to claim 1, wherein the mixture is formed into at least one shaped or unshaped body before the calcining step.

7. The method according to claim 1, wherein the calcining time ranges up to about 30 hours.

8. The method according to claim 7, wherein the calcining time ranges from about 1 hour to about 25 hours.

9. The method according to claim 1, wherein the calcining temperature ranges from about 1200° C. to about 1800° C.

10. The method according to claim 1, wherein the heating rate is at least about 1° C./min.

11. The method according to claim 1, wherein the titanate compound particles have a controlled particle size distribution characterized by a $d_{50}$ ranging from about 5 μm to about 60 μm.

12. The method according to claim 1, wherein breaking the polycrystalline material along at least a portion of the microcracks comprises milling the polycrystalline material.

13. The method according to claim 12, wherein the polycrystalline material is self-milling.

14. The method according to claim 1, wherein the calcining temperature ranges from greater than 1500° C. to about 1700° C.

15. A method for preparing a ceramic article, the method comprising:

mixing at least one first inorganic compound chosen from sources of a first metal or metal oxide, at least one second inorganic compound chosen from sources of titania, and at least one binder to form a mixture;

calcining the mixture at a temperature for an amount of time to form a polycrystalline material comprising a plurality of titanate compound grains, wherein the polycrystalline material further comprises a plurality of microcracks;

breaking the polycrystalline material apart along at least a portion of the microcracks by energy at least partially supplied by strain energy induced by anisotropic thermal expansion to provide titanate particles wherein the polycrystalline material is broken apart to a predetermined controlled particle size having a median particle size ranging from 1 μm to 100 μm and particle size distribution having $D_{breadth}$ ranging from 0.5 to 2.0 independent of a milling process used, wherein $D_{breadth}$ is $(d_{90}-d_{10})/d_{50}$; and preparing a ceramic batch composition comprising the titanate compound powder comprising titanate compound particles having a controlled particle size distribution.

16. The method according to claim 15, wherein the at least one first inorganic compound is chosen from sources of alumina.

17. The method according to claim 15, further comprising forming the ceramic batch composition to prepare a green ceramic body.

18. The method according to claim 17, further comprising firing the green ceramic body to prepare a ceramic article.

19. The method according to claim 18, wherein the ceramic article comprises a coefficient of thermal expansion ranging from about 0/° C. to about 25×10-7/° C. over a range of from about room temperature to about 800° C.

20. The method according to claim 15, further comprising a step of processing the ceramic batch composition to provide a ceramic plug or ceramic skin for application to a ceramic article.

* * * * *

UNITED STATES PATENT AND TRADEMARK OFFICE
CERTIFICATE OF CORRECTION

PATENT NO. : 10,301,222 B2
APPLICATION NO. : 15/527227
DATED : May 28, 2019
INVENTOR(S) : Monika Backhaus-Ricoult et al.

It is certified that error appears in the above-identified patent and that said Letters Patent is hereby corrected as shown below:

On the Title Page

On page 2, in Column 2, item (56), Other Publications, Line 7, delete "Sinteringof" and insert -- Sintering of --, therefor.

In the Claims

In Column 18, Line approx. 35, Claim 19, delete "10-7/° C." and insert -- $10^{-7}/°$ C. --, therefor.

Signed and Sealed this
Twenty-second Day of October, 2019

Andrei Iancu
*Director of the United States Patent and Trademark Office*